(12) United States Patent
Yoon

(10) Patent No.: US 10,131,058 B2
(45) Date of Patent: Nov. 20, 2018

(54) ROBOT ARM MECHANISM

(71) Applicant: LIFE ROBOTICS INC., Tokyo (JP)

(72) Inventor: Woo-Keun Yoon, Tokyo (JP)

(73) Assignee: Life Robotics Inc., Tokyo (JP)

( * ) Notice: Subject to any disclaimer, the term of this patent is extended or adjusted under 35 U.S.C. 154(b) by 0 days.

(21) Appl. No.: 15/605,376

(22) Filed: May 25, 2017

(65) Prior Publication Data

US 2017/0266819 A1 Sep. 21, 2017

Related U.S. Application Data

(63) Continuation of application No. PCT/JP2015/083430, filed on Nov. 27, 2015.

(30) Foreign Application Priority Data

Nov. 29, 2014 (JP) ................ 2014-242673

(51) Int. Cl.
*B25J 18/02* (2006.01)
*F16G 13/20* (2006.01)
(Continued)

(52) U.S. Cl.
CPC .............. *B25J 18/02* (2013.01); *B25J 17/00* (2013.01); *F16G 13/20* (2013.01); *F16H 19/02* (2013.01); *Y10S 901/28* (2013.01)

(58) Field of Classification Search
CPC . B25J 18/025; B25J 9/065; B25J 18/02; B25J 9/06

See application file for complete search history.

(56) References Cited

U.S. PATENT DOCUMENTS 4,393,728 A * 7/1983 Larson ................. B05B 15/061
248/160
6,419,603 B1 * 7/2002 Grasl ....................... B66F 3/06
474/148

(Continued)

FOREIGN PATENT DOCUMENTS

JP 5-3300 1/1993
JP 2011-144832 A 7/2011

(Continued)

*Primary Examiner* — William Kelleher
*Assistant Examiner* — Gregory T Prather
(74) *Attorney, Agent, or Firm* — Norris McLaughlin, P.A.

(57) ABSTRACT

A purpose is to prevent a first connection piece string from colliding against a second connection piece string in a robot arm mechanism including a linear extension and retraction joint. In the robot arm mechanism having the linear extension and retraction joint, the linear extension and retraction joint includes an arm section, and an ejection section for supporting the arm section, the arm section includes a first connection piece string 21 made by a plurality of first connection pieces, and a second connection piece string made by a plurality of second connection pieces, the second connection piece string is sent out forward from the ejection section together with the first connection piece string in a state where the second connection piece string is joined to the first connection piece string, and a flexible guide rail for separating the first connection piece string from the second connection piece string and guiding the second connection piece string to the ejection section is interposed between the first connection piece string and the second connection piece string behind the ejection section.

5 Claims, 8 Drawing Sheets

(51) Int. Cl.
*F16H 19/02* (2006.01)
*B25J 17/00* (2006.01)

(56) References Cited

U.S. PATENT DOCUMENTS

| | | | |
|---|---|---|---|
| 7,258,521 B2 * | 8/2007 | Guerra | B25J 9/104 |
| | | | 414/749.1 |
| 7,621,078 B2 | 11/2009 | Phelan et al. | |
| 9,294,737 B2 * | 3/2016 | Hatcher, Jr. | B25J 9/065 |
| 9,687,981 B2 * | 6/2017 | Hafenrichter | B25J 5/007 |
| 2012/0024091 A1 * | 2/2012 | Kawabuchi | B25J 9/045 |
| | | | 74/37 |
| 2013/0068061 A1 * | 3/2013 | Yoon | B25J 18/025 |
| | | | 74/490.05 |
| 2017/0225325 A1 * | 8/2017 | Yoon | B25J 9/06 |

FOREIGN PATENT DOCUMENTS

| | | |
|---|---|---|
| JP | 2014-139482 A | 7/2014 |
| WO | 2011/152265 A1 | 12/2011 |

\* cited by examiner

ROBOT ARM MECHANISM

CROSS-REFERENCE TO RELATED APPLICATIONS

This application is continuation application of International Patent Application No. PCT/JP2015/083430 filed on Nov. 27, 2015, which is based upon and claims the benefit of priority from the prior Japanese Patent Application No. 2014-242673, filed Nov. 29, 2014, the entire contents of which are incorporated herein by reference.

FIELD

Embodiments described herein relate to a robot arm mechanism.

BACKGROUND

Conventionally, an articulated robot arm mechanism is used in various fields such as an industrial robot. For example, the robot arm mechanism is provided with a linear extension and retraction joint in combination with other joints. An arm section constituting the linear extension and retraction joint includes, for example, a first connection piece string and a second connection piece string. The first connection piece string and the second connection piece string are stored in a storage section. When a motor rotates forward to drive the linear motion joint, the first connection piece string and the second connection piece string stored in the storage section are joined and sent out as a columnar body. When the motor rotates backward, the arm section is pulled back to the storage section, and the columnar body is separated into the first connection piece string and the second connection piece string to be stored in the storage section. In such a robot arm mechanism, the first connection piece string may collide against the second connection piece string in the storage section if no countermeasure is taken.

BRIEF DESCRIPTION OF THE INVENTION

A purpose of the present invention is to prevent a first connection piece string from colliding against a second connection piece string in a robot arm mechanism including a linear extension and retraction joint.

The robot arm mechanism according to the present embodiment includes a linear extension and retraction joint, the linear extension and retraction joint includes an arm section, and an ejection section for supporting the arm section, the arm section includes a first connection piece string and a second connection piece string, the first connection piece string includes a plurality of first connection pieces each having a U-shaped cross section, a hollow square cross section or an arc cross section, the second connection piece string includes a plurality of second connection pieces each having a substantially flat plate shape, the second connection piece string is sent out forward from the ejection section together with the first connection piece string in a state where the second connection piece string is joined to the first connection piece string, and a flexible guide rail for separating the first connection piece string from the second connection piece string and guiding the second connection piece string to the ejection section is interposed between the first connection piece string and the second connection piece string behind the ejection section.

DETAILED DESCRIPTION OF THE INVENTION

Figure 1:
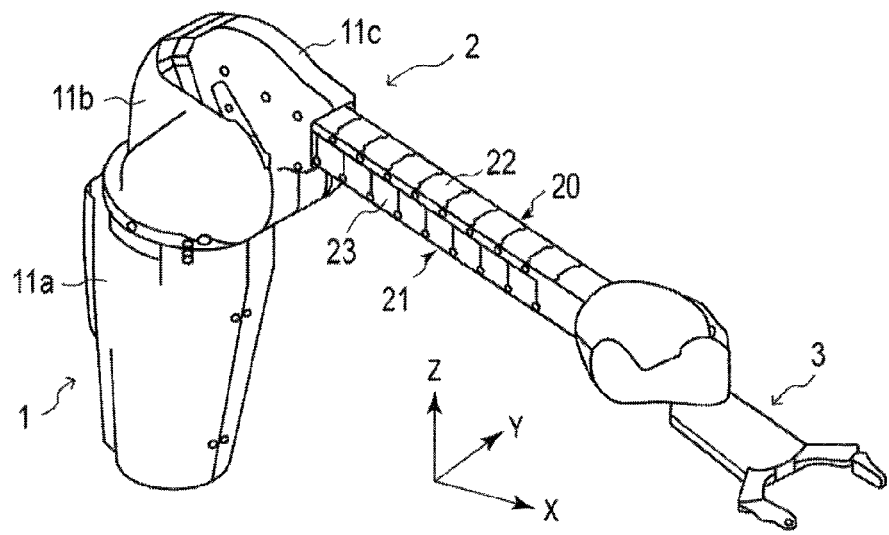
FIG. 1 is an external perspective view of a robot arm mechanism according to an embodiment.

Hereinafter, a robot arm mechanism according to the present embodiment is described with reference to the accompanying drawings. In the following description, the same reference numerals denote components having substantially identical functions and structures, and the repeated description thereof is made only when necessary.

Figure 2:
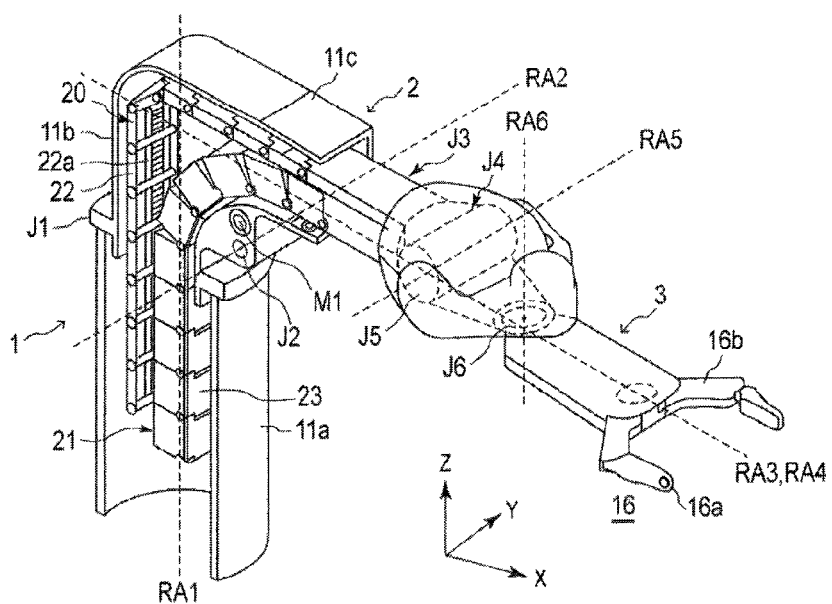
FIG. 2 is a perspective view illustrating an internal structure of the robot arm mechanism in FIG. 1.
Figure 3:
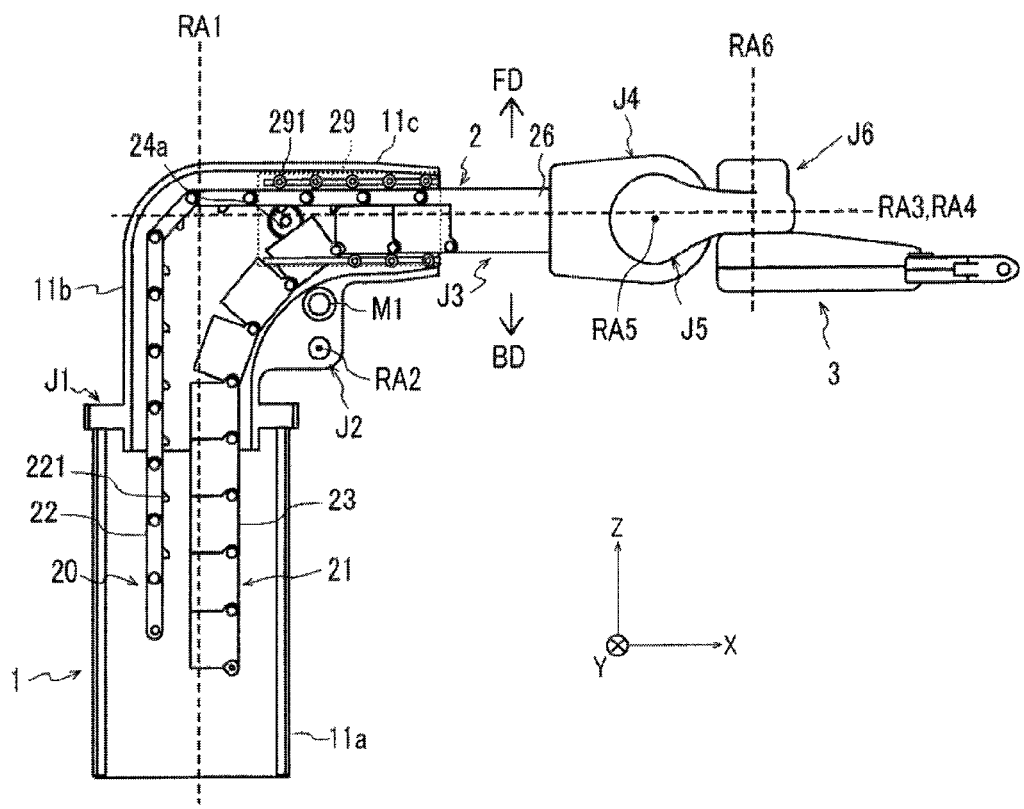
FIG. 3 is a view illustrating an internal structure of the robot arm mechanism in FIG. 1, which is a cross section view.

FIG. 1 is an external perspective view of the robot arm mechanism according to the present embodiment. FIG. 2 and FIG. 3 are diagrams illustrating an internal structure of the robot arm mechanism in FIG. 1. The robot arm mechanism includes a substantially cylindrical base 1 and an arm section 2 connected to the base 1. An end effector 3 is attached to a tip of the arm section 2. In FIG. 1, a hand section capable of holding an object is shown as the end effector 3. The end effector 3 is not limited to the hand section, but may be another tool, a camera, or a display. At the tip of the arm section 2, an adapter which can be replaced with any type of the hand end effector 3 may be provided.

The arm section 2 includes a plurality (herein, six) of joints J1, J2, J3, J4, J5 and J6. The plurality of the joints J1, J2, J3, J4, J5 and J6 are arranged in order from the base 1. Generally, a first axis RA1, a second axis RA2 and a third axis RA3 are called root three axes, and a fourth axis RA4, a fifth axis RA5 and a sixth axis RA6 are called wrist three axes for changing the posture of the hand section 3. At least one of the joints J1, J2 and J3 constituting root three axes is a linear motion joint. Herein, the third joint J3 is formed as a linear motion joint, in particular, a joint with a relatively long extension distance. The first joint J1 is a torsion joint that rotates on the first axis of rotation RA1 which is held, for example, perpendicularly to a base surface. The second joint J2 is a bending joint that rotates on the second axis of rotation RA2 perpendicular to the first axis of rotation RA1. The third joint J3 linearly extends or retracts along the third axis (axis of movement) RA3 perpendicular to the second axis of rotation RA2. The fourth joint J4 is a torsion joint that rotates on the fourth axis of rotation RA4 which matches the third axis of movement RA3. The fifth joint J5 is a bending joint that rotates on the fifth axis of rotation RA5 orthogonal to the fourth axis of rotation RA4. The sixth joint J6 is a bending joint that rotates on the sixth axis of rotation RA6 orthogonal to the fourth axis of rotation RA4 and perpendicular to the fifth axis of rotation RA5.

The arm section 2 turns together with the hand section 3 in accordance with torsional rotation of the first joint J1. The arm section 2 rotates upward and downward on the second axis of rotation RA2 of the second joint J2 together with the hand section 3 in accordance with bending rotation of the second joint J2. An arm support body (first support body) 11a forming the base 1 has a cylindrical hollow structure formed around the axis of rotation RA1 of the first joint J1. The first joint J1 is mounted on a fixed base (not shown). When the first joint J1 rotates, the first support body 11a axially rotates in accordance with the turn of the arm section 2. The first support body 11a may be fixed on a ground plane. In this case, the arm section 2 turns independently of the first support body 11a. A second support body 11b is connected to an upper part of the first support body 11a.

The second support body 11b has a hollow structure continuous to the first support body 11a. One end of the second support body 11b is attached to a rotating section of the first joint J1. The other end of the second support body 11b is opened, and a third support body 11c is set rotatably on the axis of rotation RA2 of the second joint J2. The third support body 11c has a scaly hollow structure communicating with the first support body 11a and the second support body 11b. In accordance with the bending rotation of the second joint J2, a rear part of the third support body 11c is accommodated in or sent out from the second support body 11b. The rear part of the third joint J3, which constitutes a linear motion joint of the arm section 2, is housed inside the continuous hollow structure of the first support body 11a and the second support body 11b by retraction thereof. The inside of the hollow structure is called a storage section.

The first joint J1 includes an annular fixed section and a rotating section, and is fixed to a base at the fixed section. The first support body 11a and the second support body 11b are attached to the rotating section. When the first joint J1 rotates, the first support body 11a, the second support body 11b and the third support body 11c turn around the first axis of rotation RA1 together with the arm section 2 and the hand section 3.

The third support body 11c is set rotatably, at the lower part of its rear end, on the axis of rotation RA2 with respect to a lower side of an open end of the second support body 11b. In this way, the second joint J2 serving as a bending joint that rotates on the axis of rotation RA2 is formed. When the second joint J2 rotates, the arm section 2 rotates vertically, i.e., rotates upward and downward, on the axis of rotation RA2 of the second joint J2 together with the hand section 3. The axis of rotation RA2 of the second joint J2 is perpendicular to the first axis of rotation RA1 of the first joint J1 serving as a torsion joint.

As described above, the third joint J3 serving as a joint section constitutes a main constituent of the arm section 2. The hand section 3 described above is provided at the tip of the arm section 2 as shown in FIG. 1. The hand section 3 is moved to a given position by the first joint J1, the second joint J2 and the third joint J3, and placed in a given posture by the fourth joint J4, the fifth joint J5 and the sixth joint J6. The hand section 3 includes two fingers 16a and 16b configured to be opened and closed. The fourth joint J4 is a torsion joint having the axis of rotation RA4 which typically matches a center axis of the arm section 2 along the extension and retraction direction of the arm section 2, that is, the axis of movement RA3 of the third joint J3. When the fourth joint J4 rotates, the hand section 3 rotates on the axis of rotation RA4 from the fourth joint J4 to the tip thereof.

The fifth joint J5 is a bending joint having an axis of rotation RA5 orthogonal to the axis of movement RA4 of the fourth joint J4. When the fifth joint rotates, the hand section 3 pivots up and down from the fifth joint J5 to its tip together with the hand 16. The sixth joint J6 is a bending joint having an axis of rotation RA6 orthogonal to the axis of rotation RA4 of the fourth joint J4 and perpendicular to the axis of rotation RA5 of the fifth joint J5. When the sixth joint J6 rotates, the hand 16 turns left and right.

Rotation, bending, and extension and retraction of the first to sixth joints J1-J6 enable positioning a two-fingered hand 16 of the hand section 3 at a given position and posture. In particular, the linear extension and retraction distance of the third joint J3 enables the hand section 3 to act on an object in a wide range from a position close to the base 1 to a position far from the base 1.

The third joint J3 is characterized by the linear extension and retraction distance realized by a linear extension and retraction arm mechanism constituting the third joint J3. The linear extension and retraction distance is achieved by the structure shown in FIG. 2 and FIG. 3. The linear extension and retraction arm mechanism includes a first connection piece string 21 and a second connection piece string 20. In an alignment pose where the arm section 2 is horizontal, the first connection piece string 21 is located below the second connection piece string 20, and the second connection piece string 20 is located above the first connection piece string 21.

The first connection piece string 21 includes a plurality of first connection pieces 23 having the same U-shaped cross section and connected to form a string by pins at their back surface parts. The first connection piece string 21 is bendable in its back surface direction BD but conversely not bendable in its front surface direction FD due to the shape of the cross section of the first connection piece 23 and connection positions by the pins. Therefore, the shape of the cross section of the first connection piece 23 may be a hollow square shape, an arc, etc. as well as the U shape.

The second connection piece string 20 has a substantially flat plate shape with a width substantially equivalent to that of the first connection piece 23, and includes a plurality of second connection pieces 22 connected to form a string by pins in a bendable state in both the back surface direction BD and the front surface direction FD. The first connection piece string 21 is joined to the second connection piece string 20 at the tip of the first connection piece string 21 by a joining piece 26. The joining piece 26 has an integrated shape of the first connection piece 23 and the second connection piece 22. As shown in FIG. 2, a linear gear 22a is formed on the inside of each of the second connection piece 22. The linear gears 22a are connected to form a continuous linear gear (rack) when the second connection piece 22 has a linear shape. The front side of the first connection piece 23 faces the back surface side of the second connection piece 22. The back surface side of the first connection piece 23 and the front side of the second connection piece 22 face the inner surface of the base 1, the second support body 11b or the third support body 11c.

FIG. 3 is a view illustrating an internal structure of the robot arm mechanism in FIG. 1, which is viewed from a cross sectional direction.

As shown in FIG. 3, the second connection piece 22 is sandwiched between a roller 291 and a drive gear 24a in an ejection section 29. The linear gear 22a is engaged with the drive gear 24a. When the arm is extended, a motor M1 is driven, and the drive gear 24a rotates forward, so that the second connection piece string 20 is sent out forward from the ejection section 29 together with the first connection piece string 21. At that time, the first connection piece string 21 and the second connection piece string 20 are sandwiched by the ejection section 29, and pressed against each other to be joined. At this time, the back surface side of the first connection piece 23 is joined to the back surface side of the second connection piece 22. The first connection piece string 21 and the second connection piece string 20 joined together are supported by the ejection section 29, and thus the joined state is maintained. When the joined state between the first connection piece string 21 and the second connection piece string 20 is maintained, bending of the first connection piece string 21 and the second connection piece string 20 is restricted, whereby the first connection piece string 21 and the second connection piece string 20 constitute a columnar body having a certain rigidity. Then, the joined columnar body (the first connection piece string 21 and the second connection piece string 20) is linearly sent out along the third axis of movement RA3 starting with the joining piece 26. The ejection section 29 has a rectangular cylindrical shape. The width of the hollow part is substantially equal to the width of the columnar body. On the side surface thereof, a plurality of rollers 291 are rotatably provided to support the columnar body from the side. The ejection section 29 is fixed to the second support body 11c or the second support body 11b. Therefore, the ejection section 29 turns together with the arm section 2 and the hand section 3 around the first rotation axis RA1. In addition, the ejection section 29 rotates vertically, i.e., rotates upward and downward, together with the arm section 2 and the hand section 3 on the second axis of rotation RA2.

When the arm is retracted, the motor M1 is driven, and the drive gear 24a rotates backward, so that the joined state of the second connection piece string 20 and the first connection piece string 21 is canceled in the ejection section 29, and they are separated from each other. The second connection piece string 20 and first connection piece string 21 separated from each other restore their bendable state, are bent in a direction along the first axis of rotation RA1, and are housed inside the storage section.

Figure 4:
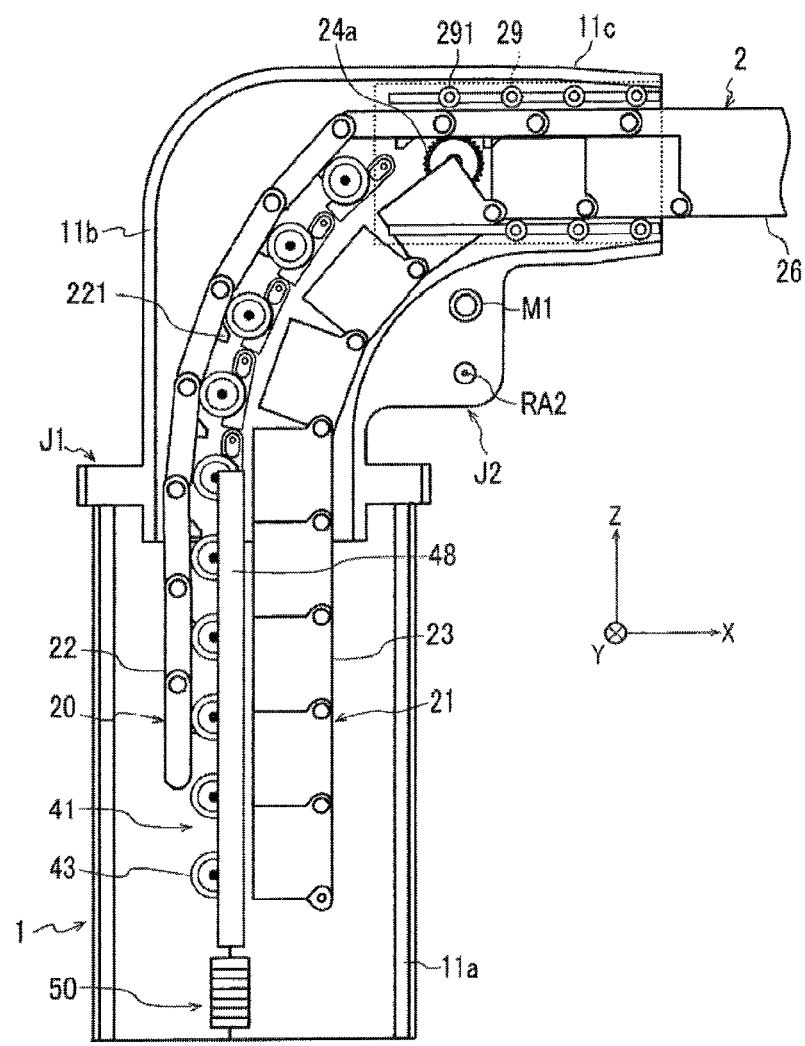
FIG. 4 is a diagram illustrating a storage structure of the robot arm mechanism according to the present embodiment.

FIG. 4 is a diagram illustrating a storage structure of the robot arm mechanism according to the present embodiment. A guide rail 41 includes a plurality of rail pieces 43 connected to form a string by pins. As shown in FIG. 4, one end of the guide rail 41 is attached to a rear end portion of the ejection section 29 by using pinholes 431 and 432 of the leading rail piece 43. The other end of the guide rail 41 is fixed to one end of a spring 50 by using a pinhole 433 of the last rail piece 43. The other end of the spring 50 is fixed to the bottom of the base 1 (the first support body 11a). The spring 50 extends and retracts in an axial direction of the base 1. A guide rail storage section 48 is fixed to the first support body 11a. The guide rail storage section 48 is fixed to an inner surface of the base 1. The guide rail storage section 48 is made of a pair of slide rails. Both ends of the rail piece 43 slide along the slide rail and are stored. The guide rail storage section 48 may be extended to the second support body 11b.

Next, the plurality of the rail pieces 43 constituting the guide rail 41 are described with reference to FIGS. 5, 6 and 7.

Figure 5A:
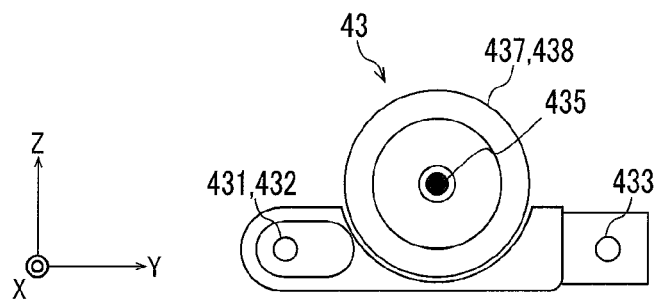
FIGS. 5A, 5B and 5C are diagrams illustrating a rail piece of the robot arm mechanism according to the present embodiment.
Figure 5B:
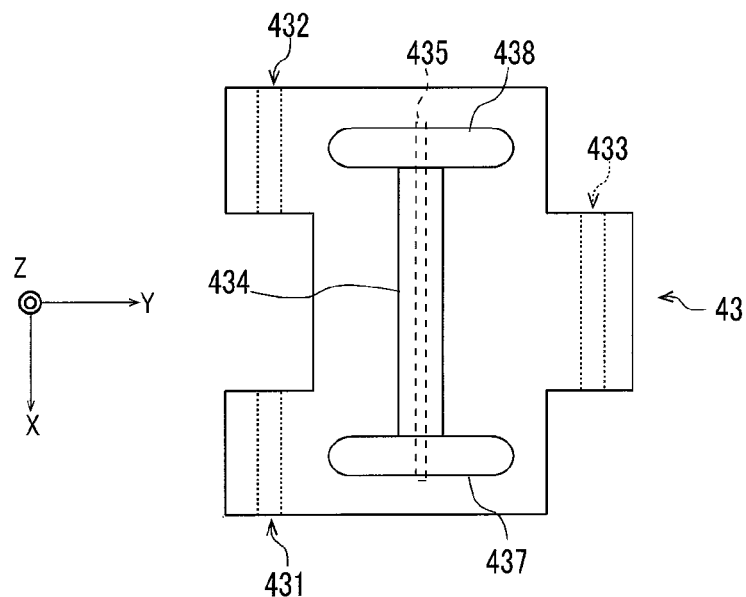
Figure 5C:
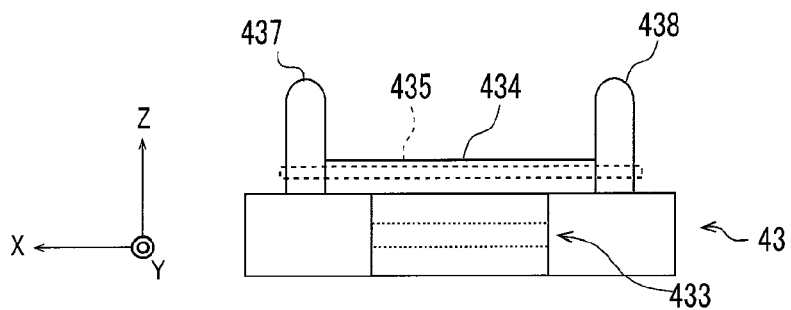

FIGS. 5A, 5B and 5C are diagrams illustrating a structure of the rail piece 43 of the robot arm mechanism according to the present embodiment. FIGS. 5A, 5B and 5C show the rail piece 43 viewed in the orthogonal three axes directions. FIGS. 5A, 5B and 5C show the rail piece 43 viewed from a side (+X direction), above (+Z direction), and below (+Y direction) direction, respectively.

Figure 6:
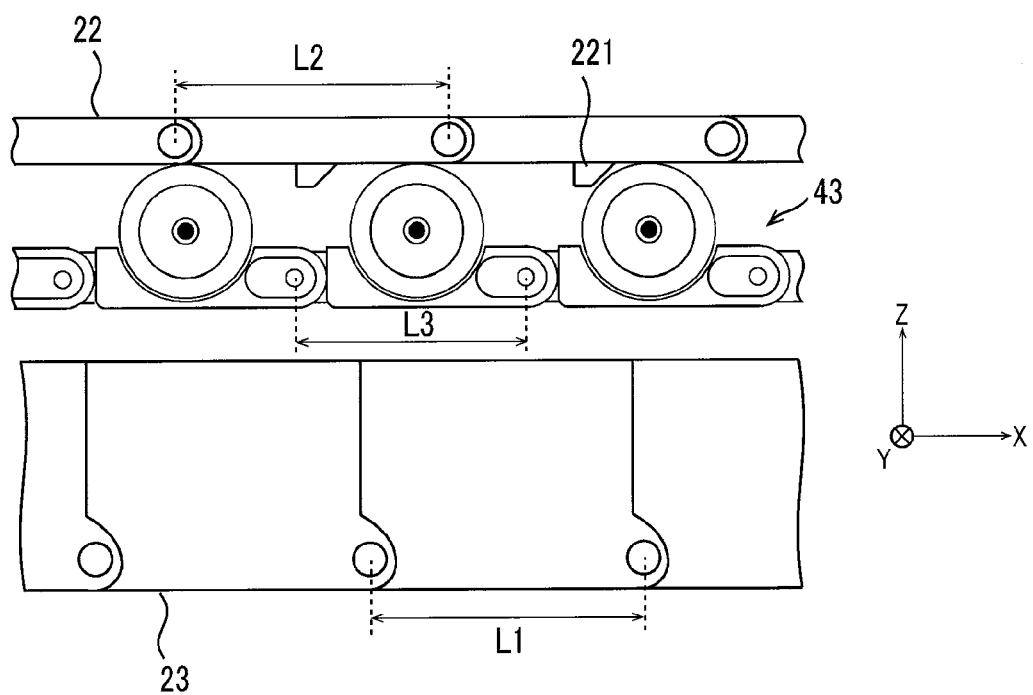
FIG. 6 is a diagram corresponding to FIG. 4 and illustrating an actual positional relationship between the rail guide, a first connection piece string, and a second connection piece string, which is viewed from a cross sectional direction.

FIG. 6 corresponds to FIG. 4 and is a diagram illustrating an actual positional relationship between the rail guide 41 and the first connection piece string 21 and the second connection piece string 20, which is viewed from a cross sectional direction.

Figure 7:
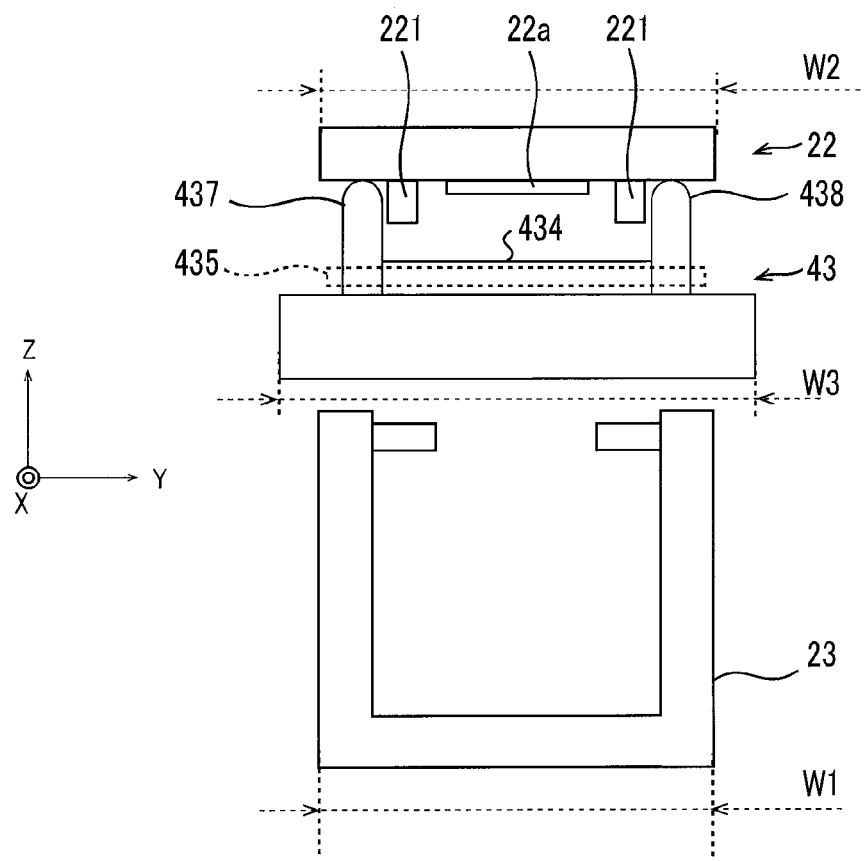
FIG. 7 is a diagram corresponding to FIG. 4 and illustrating an actual positional relationship between the rail guide, the first connection piece string, and the second connection piece string, which is viewed in a sending-out direction.

FIG. 7 corresponds to FIG. 4 and is a diagram illustrating an actual positional relationship between the rail guide 41 and the first connection piece string 21 and the second connection piece string 20, which is viewed from a sending-out direction.

As shown in FIGS. 5A, 5B and 5C, the tip portion of the rail piece 43 has a concave shape with the pinholes 431 and 432 which are formed on both sides, and into which the pins for connection with the rear end portion of the rail piece 43 are inserted. The axial direction of the pinholes 431 and 432 is parallel to the width direction of the rail piece 43. Pinhole 431 has the same axial length as pinhole 432. The length obtained by adding the axial length of pinhole 432 to the axial length of pinhole 431 is shorter than the width of the rail piece 43. The rear end portion of the rail piece 43 has a convex shape with a pinhole 433 into which a pin for connection with the tip portion of the rail piece 43 is inserted. The axial direction of pinhole 433 is parallel to the width direction of the rail piece 43. The axial length of pinhole 433 is shorter than the width of the rail piece 43. The sum of the axial lengths of pinholes 431,432 and 433 are substantially equal to the width of the rail piece 43. However, the sum of the axial lengths of pinholes 431,432 and 433 may be any length as long as it is equal to or less than the width of the rail piece 43. When the tip of a rail piece is fitted to the rear end of the adjacent rail piece 43, pinholes 431,432 and 433 form a single pinhole in a straight line. By inserting a single pin into the single pinhole, the adjacent rail pieces 43 are connected.

As shown in FIG. 6, the length L3 from pinholes 431 and 432 at the tip to pinhole 433 at the rear end of the rail piece 43 is smaller than the length L2 from the pinhole at the tip to the pinhole at the rear end of the second connection piece 22. As shown in FIG. 4, the first connection piece string 21, the second connection piece string 20 and the guide rail 41 are rotated on the second axis of rotation RA2. At that time, the guide rail 41 is located inside the second connection piece string 20. Therefore, the length L3 of the rail piece 43 is shorter than the length L2 of the second connection piece 22, so that the track of the guide rail 41 can be smoother than that of the second connection piece string 20. As a result, the guide rail 41 can smoothly guide the second connection piece string 20 to the ejection section 20. The length L1 from the pinhole at the tip to the pinhole at the rear end of the first connection piece 23 is substantially equal to the length L2 from the pinhole at the tip to the pinhole at the rear end of the second connection piece 22.

As shown in FIG. 7, the width W3 of the rail piece 43 is longer than the width W1 of the first connection piece 23 and the width W2 of the second connection piece 22. The width W1 of the first connection piece 23 is equal to the width W2 of the second connection piece 22. For example, the width W3 of the rail piece 43 is 1.05 to 1.5 times greater than the width W1 of the first connection piece 23. Therefore, for example, even when the first connection piece 23 and the second connection piece 22 deviate in the width direction for some reason, interference between the first connection piece 23 and the second connection piece can be prevented by the rail piece 43.

As shown in FIGS. 5A, 5B and 5C, a shaft hole 434 is formed in the surface near the middle point of the rail piece 43 in the length direction. The axial direction of the shaft hole 434 is parallel to the width direction of the rail piece 43. The middle point in the axial direction of the shaft hole 434 matches the middle point in the width direction of the rail piece 43. The shaft hole 434 is shorter than the width W2 of the second connection piece 22, and preferably, as shown in FIG. 7, the axial length of the shaft hole 434 is approximately equal to the length from the outer side surface of one of two lock sections 221 provided on the back surface of the second connection piece 22 to the outer side surface of the other one. A shaft 435 longer than the shaft hole 434 is inserted into the shaft hole 434. Wheels 437 and 438 are fixed to both ends of the shaft 435, respectively. The surface of wheel 437 is covered with an elastic body such as rubber. The damage of the second connection piece 22 due to contact between the wheels 437 and 438 and the second connection piece 22 can be thereby prevented. Wheel 437 has a width shorter than the distance from the back surface of the second connection piece 22 to the outer side surface of the lock section 221 provided on the back surface of the second connection piece 22. Further, the wheel 437 has a radius longer than the distance from the back surface of the second connection piece 22 to the lower end of the lock section 221. Wheel 438 has the same shape as wheel 437.

A depression is formed from both ends of the shaft hole 434 to the side surface of the rail piece 43. The depth from the hole center of the shaft hole 434 to the bottom surface of the depression is slightly deeper than the radius of the wheels 437 and 438. The length from the hole center of the shaft hole 434 to the end of the depression in the length direction is slightly longer than the radius of the wheels 437 and 438. Accordingly, the wheels 437 and 438 fixed to the both ends of the shaft 435 can rotate without interfering with the rail piece 43. For example, the depression has an arc shape when the rail piece 43 is viewed from its side.

A projection length from the surface of the rail piece 43 towards the second connection piece 22 is substantially the same as the radius of the wheels 437 and 438. When the rail piece 43 is brought into contact with the second connection piece 22, the pieces 437 and 438 of the rail piece 43 are in contact with the back surface of the second connection piece 22 and are not in contact with the lock section 221.

Next, a structure of the guide rail 41 is described.

Figure 8A:
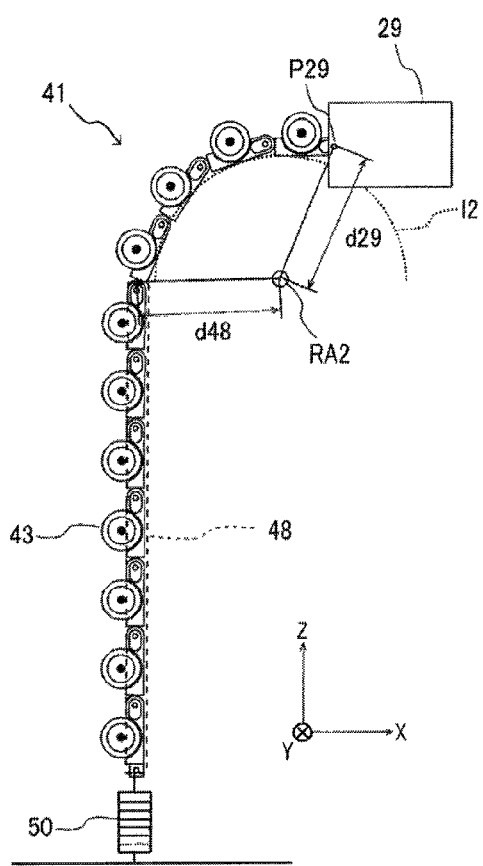
FIGS. 8A and 8B are diagrams illustrating a structure of the guide rail of the robot arm mechanism according to the present embodiment.
Figure 8B:
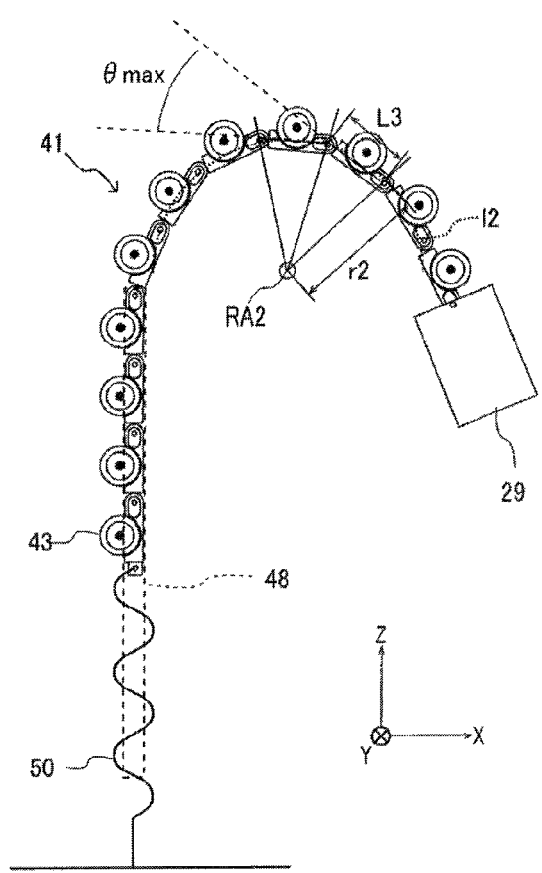

FIGS. 8 and 8C are diagrams illustrating a structure of the guide rail 41 of the robot arm mechanism according to the present embodiment. FIG. 8A shows the guide rail 41 in a posture in which the arm section 2 is horizontally arranged (hereinafter, referred to as a horizontal posture). FIG. 8B shows the guide rail 41 in a posture in which the arm section 2 is lowered from the posture in FIG. 8A by a predetermined angle (hereinafter, referred to as a lowered posture).

As shown in FIGS. 8A and 8B, when the arm section 2 changes from the horizontal posture to the lowered posture, the ejection section 29 rotates on the second axis of rotation RA2 by a predetermined angle. In accordance with the rotation, the guide rail 41 is pulled by the ejection section 2. When a pulling force is exerted on the guide rail 41 by the ejection section 29, the spring 50 is extended, and the guide rail 41 is pulled out from the guide rail storage section 48. On the other hand, when the arm section 2 returns from the lowered posture to the horizontal posture, the guide rail 41 pulled out from the guide rail storage section 48 is stored in the guide rail storage section 48. At this time, a pushing force is exerted on the guide rail 41 by the spring 50, whereby the guide rail 41 can be smoothly stored in the guide rail storage section 48. The rear end of the guide rail 41 may be free. At this time, the effect of the spring 50 as described above cannot be produced.

The guide rail 41 has flexibility. Specifically, the guide rail 41 is not bendable in the front surface direction and is bendable in the back surface direction. The bending angle θmax in the back surface direction is limited. The bending angle of a connection portion is limited by the pin connecting two rail pieces 43. The bending angle of the connection portion may be limited by the shape of the pieces at the connection portion.

The guide rail storage section 48 has a function of limiting a bendable range of the guide rail 41 in addition to the function of storing the guide rail 41 along the axial direction of the base 1. By prohibiting bending of the guide rail 41 stored in the base 1, it is possible to avoid the contact of the guide rail 41 with the first connection piece string 21. For example, let us assume that the posture changes from the horizontal posture to the lowered posture as shown in FIG. 8. At this time, the guide rail 41 is pulled by the ejection section 29. The direction in which the guide rail 41 in the base 1 is pulled is not parallel to the axial direction of the base 1 but is a direction slightly inclined toward the first connection piece 21 side. If the entire guide rail 41 is bendable, the guide rail 41 may be inclined toward the first connection piece string 21 side. Thus, the guide rail 41 may come into contact with the first connection piece string 21 and disturb smooth sending of the first connection piece string 21. When the guide rail 41 stored in the base 1 is stored in the guide rail storage section 48, the guide rail 41 is stored in the guide rail storage section 48 without being inclined regardless of how the guide rail 41 is pulled. Therefore, the guide rail 41 never comes into contact with the first connection piece string 21 and the second connection piece string 20.

On the other hand, bending of the guide rail 41 is permitted from the tip of the guide rail storage section 48 to the ejection section 29. The bendable angle of the guide rail 41 is limited. Specifically, the guide rail 41 is unbendable in the front surface direction while being bendable in the back surface direction, and its bending angle θmax is limited. Accordingly, the guide rail 41 can move along an arc shape around the second axis of rotation RA2. As shown in FIGS. 8A and 8B, the bending angle θmax is, for example, the exterior angle of when an arc 12 around the second axis of rotation RA2 with radius r2 is arranged in contact with the guide rail 41 having length L3. Radius r2 may be determined based on the distance from the rotation center of the second axis of rotation RA2 to a fixed point P29 of the guide rail 41 in the ejection section 29 and the distance from the rotation center of the second axis of rotation RA2 to a tip P48 of the guide rail storage section 48. The bending angle θmax may be determined to allow a gentle track to be formed from a fixed position of the guide rail 41 at the rear end of the ejection section 29 to the tip of the guide rail storage section 48, not by a geometric method as described above. Accordingly, even when the arm section 2 rotates upward or downward, as the guide rail 41 bends in a limited angle range, the guide rail 41 can move along a predesignated track. Since the guide rail 41 can bend only within the limited angle range, the guide rail 41 has a certain rigidity. Since the arm section 2 rotates upward or downward only in the front surface direction of the guide rail 41, the guide rail 41 may be bendable in the front surface direction. In this case, there is a higher possibility that the guide rail 41 does not follow the track designed in advance than in the case where bending in the surface direction is impossible.

As stated above, the track of the guide rail 41 in the base 1 is determined by the guide rail storage section 48. The track of the guide rail 41 from the tip portion of the guide rail storage section 48 to the rear end of the ejection section 29 is designed in advance in accordance with the bending angle θmax of the guide rail 41. Therefore, even when the arm section 2 rotates upward or downward, the guide rail 41 is arranged between the first connection piece string 21 and the second connection piece string 20. Therefore, the guide rail 41 can separately store the second connection piece string 20 and the first connection piece string 21 separated in the ejection section 29. Accordingly, it is possible to prevent the second connection piece string 20 from interfering with the first connection piece string 21. The guide rail 41 can guide the second connection piece string 20 to the ejection section 29 along the track designed in advance (in the sending-out direction) even when the arm section 2 rotates upward or downward.

Figures 9A, 9B:
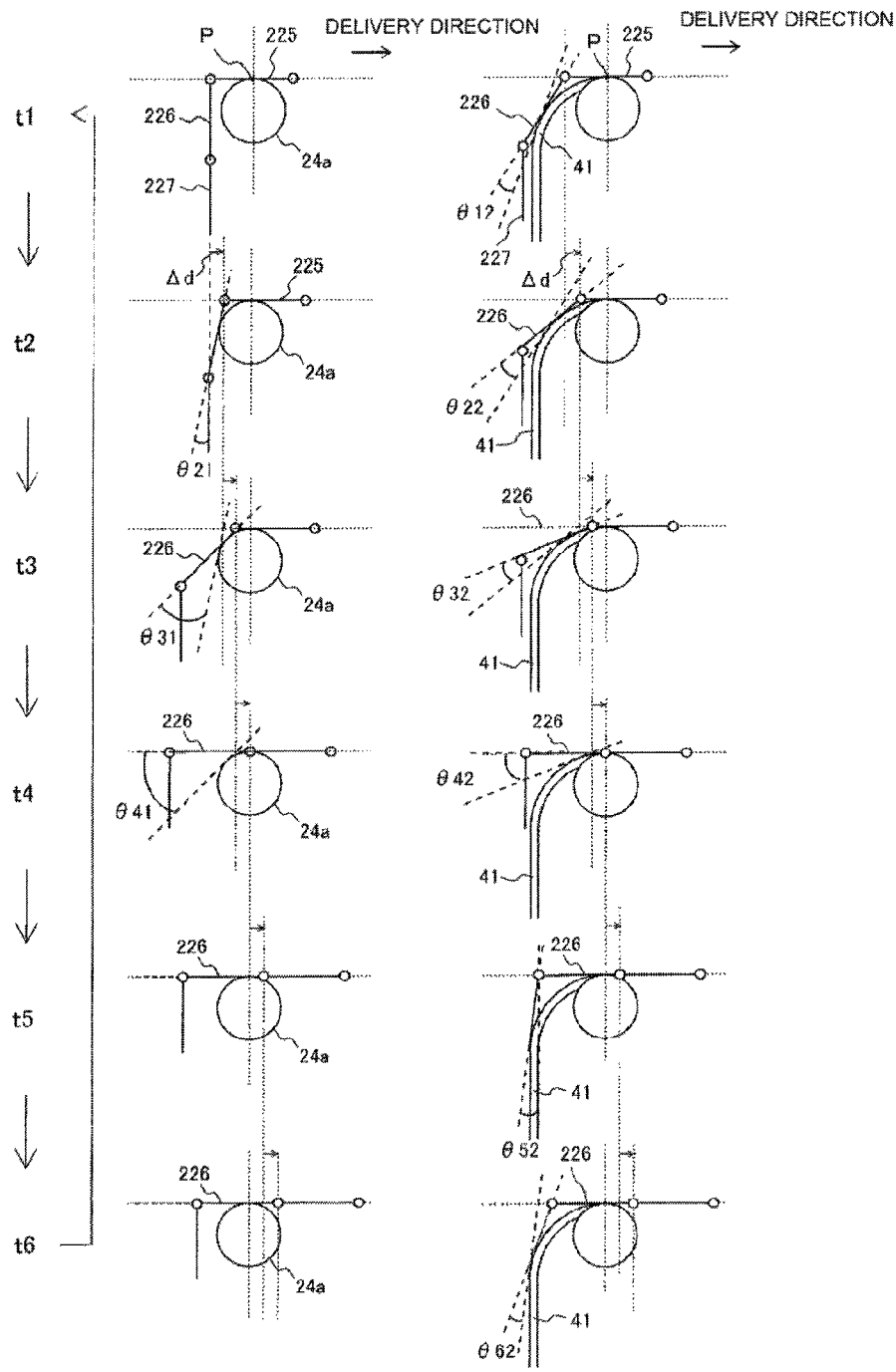
FIGS. 9A and 9B are supplementary explanatory diagrams illustrating an effect of the guide rail of the robot arm mechanism according to the present embodiment.

FIGS. 9A and 9B are supplementary explanation diagrams illustrating an effect of the guide rail 41 of the robot arm mechanism according to the present embodiment. FIGS. 9A and 9B are diagrams illustrating a difference of tracks (hereinafter, referred to as guide tracks) for guiding the second connection piece string 20 to the ejection section 29 caused by the presence or absence of the guide rail 41. FIG. 9A shows a guide track of the second connection piece string 20 of the case where the guide rail 41 is not provided. FIG. 9B shows a guide track of the second connection piece string 20 of the case where the guide rail 41 is provided. In the robot arm mechanism according to the present embodiment, the second connection piece string 20 is stored in the storage section along the axial direction of the base 1. The second connection piece string 20 is necessary to rotate on the second axis of rotation RA2 from the stored state before being sent out from the ejection section 29. For example, when the arm section 2 is in the horizontal posture, the arm section 2 is sent out in a direction orthogonal to the axial direction of the base 1. Therefore, the second connection piece string 20 is guided to the ejection section 29 after rotating 90 degrees on the second axis of rotation RA2 from the state of being stored in the storage section. Then, the second connection piece string 20 is joined to the first connection piece string 21 in the ejection section 29 and is sent out together with the first connection piece string 21 toward the front side of the ejection section 29. At this time, the guide rail 41 guides the second connection piece string 20 to the ejection section 29 along the track designed in advance. Its effect is described with reference to FIGS. 9A and 9B.

FIGS. 9A and 9B show three consecutive second connection pieces 225, 226, and 227. Described herein is the track along which second connection piece 226 is rotated by 90 degrees from the stored state to be guided to the drive gear 24a inside the ejection section 29. FIG. 9A shows the case where the guide rail 41 is not provided. FIG. 9B shows the case where the guide rail 41 is provided. States t1-t6 indicate the change in the state of the second connection pieces 225, 226 and 227 made each time the drive gear 24a rotates by a step angle and the arm section 2 moves by Δd in the sending-out direction. State t1 is a state in which the linear gear 22a of the second connection piece 225 is engaged with the drive gear 24a. The drive gear 24a is engaged with the linear gear 22a of the second connection piece 225 at position P. The states between t1 and t4 show the second connection piece 225 being sent out in the sending-out direction by the drive gear 24a. The state t4 is a state immediately after the drive gear 24a is engaged with the linear gear 22a of the second connection piece 226 at position P. States t5 and t6 show the second connection piece 226 being sent out by the drive gear 24a.

It can be understood that, without the guide rail 41 (FIG. 9A), the second connection piece 226 rotates largely at the moment when the linear gear 22a of the second connection piece 226 is engaged with the drive gear 24a at position P. This is because the second connection piece 226 is guided little by little along a tangent of the drive gear 24a until it is engaged with the drive gear 24a and, at the moment when the second connection piece 226 is engaged with the drive gear 24a, the second connection piece 226 is rotated by the angle θ41 from the position immediately before the moment of the engagement (state t3) to the horizontal position (state t4). In other words, without the guide rail 41, the rotation angle of 90 degrees necessary for the second connection piece 226 to change from the stored state to the horizontal state cannot be dispersed as intended, which inevitably causes the case where the second connection piece 226 instantaneously rotates largely. Therefore, as in state t4, when the angle θ41 by which the second connection piece 226 rotates at the moment when the second connection piece 226 is brought into the horizontal state is large, the second connection piece 226 rotates quickly, and the second connection piece 226 may collide with the second support body 11b. As a result, a collision sound may occur, or a problem such as the second connection piece 226 is scraped off may occur.

With the guide rail 41 (FIG. 9B), the rotation angle θ42 at the moment when the linear gear 22a of the second connection piece 226 is engaged with the drive gear 24a at position P is smaller than the rotation angle θ41 of the case without the guide rail 41. Namely, at the moment when the linear gear 22a of the second connection piece 226 is engaged with the drive gear 24a, the second connection piece 226 does not largely rotate. This is because the second connection piece 226 is guided by the guide rail 41 and can be horizontal to some extent immediately before the linear gear 22a of the second connection piece 226 is engaged with the drive gear 24a (state t3). In other words, by using the guide rail 41, it is possible to intentionally disperse the rotation angle of 90 degrees necessary for the second connection piece 226 to change from the stored state to the horizontal state. Specifically, without the guide rail 41, the second connection piece 226 rotates by θ21 in state t2, θ31 in state t3 and θ41 in state t4, and rotates by 90 degrees in total. On the other hand, with the guide rail 41, the second connection piece 226 rotates by θ12 in state t1, θ22 in state t2, θ32 in state t3, θ42 instate t4, θ52 instate t5 and θ62 instate t6, and rotates by 90 degrees in total. Therefore, by using the guide rail 41, it is possible to reduce the angle at which the second connection piece 22 rotates per unit time, and it is possible to prevent a large rotation at a certain moment. Therefore, as in state t4, by reducing the angle θ42 by which the second connection piece 226 rotates at the moment when the second connection piece 226 is brought into the horizontal state, it is possible to suppress the rotational momentum of the second connection piece 226, and it is also possible to prevent the second connection piece 226 from colliding against the inner surface of the second support body 11b. Accordingly, it is possible to prevent occurrence of a collision sound and a damage of the second connection piece 226.

According to the robot arm mechanism according to the present embodiment as described above, even when the arm section 2 rotates upward and downward, the guide rail 41 can be arranged along a track designed in advance. The track of the guide rail 41 can be designed based on the bending angle of the guide rail storage section 48 and the guide rail 41. The first connection piece string 21 and the second connection piece string 20 can be thereby separated from each other and stored in the storage section. As a result, it is possible to prevent the second connection piece string 20 from interfering with the first connection piece string 21. Furthermore, according to the robot arm mechanism according to the present embodiment, the second connection piece string 20 can be guided along the guide rail 41 designed in advance to the ejection section 29 (in the sending-out direction). Specifically, the guide rail 41 can disperse the rotation of the second connection piece string 20 which is required for being sent out toward the front side of the ejection section 29 from the stored state. Since the angle of rotation per unit time can be reduced, it is possible to prevent the second connection piece 22 from rotating quickly. As a result, the second connection piece 22 can be prevented from colliding against the inner surface of the second support body 11b, and it is also possible to prevent occurrence of a collision sound and impairment of the second connection piece 22.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A robot arm mechanism comprising a linear extension and retraction joint, wherein the linear extension and retraction joint includes an arm section, and an ejection section for supporting the arm section, the arm section includes a first connection piece string and a second connection piece string, the first connection piece string includes a plurality of first connection pieces, and the second connection piece string includes a plurality of second connection pieces, the second connection piece string is sent out forward from the ejection section together with the first connection piece string in a state where the second connection piece string is joined to the first connection piece string and constitutes a columnar body with the first connection piece string, and the robot arm mechanism further comprises a guide rail interposed between the first connection piece string and the second connection piece string, wherein the guide rail comprises a plurality of rail pieces connected in a series, and wherein the guide rail is connected to a rear portion of the ejection section.

2. The robot arm mechanism according to claim 1, wherein a bending angle of the guide rail toward the first connection piece string side is limited.

3. The robot arm mechanism according to claim 1, wherein each of the rail pieces is provided with a wheel.

4. The robot arm mechanism according to claim 3, wherein a surface of each wheel is covered with an elastic body.

5. The robot arm mechanism according to claim 3, wherein the rail pieces are connected at intervals which are shorter than a length of the second connection pieces.

* * * * *